United States Patent
Daliparthi et al.

(10) Patent No.: US 11,859,048 B2
(45) Date of Patent: Jan. 2, 2024

(54) OLIGOMERISER WITH IMPROVED MIXING PERFORMANCE

(71) Applicant: SABIC GLOBAL TECHNOLOGIES B.V., Bergen op Zoom (NL)

(72) Inventors: Surya Prakasa Rao Daliparthi, Bangalore (IN); Fernan Mateos Salvador, Carretera Cartagena (ES)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 871 days.

(21) Appl. No.: 16/625,887

(22) PCT Filed: Jun. 29, 2018

(86) PCT No.: PCT/IB2018/054869
§ 371 (c)(1),
(2) Date: Dec. 23, 2019

(87) PCT Pub. No.: WO2019/003209
PCT Pub. Date: Jan. 3, 2019

(65) Prior Publication Data
US 2020/0148819 A1    May 14, 2020

(30) Foreign Application Priority Data
Jun. 30, 2017 (EP) .................................. 17382425

(51) Int. Cl.
*B01F 27/00* (2022.01)
*C08G 64/20* (2006.01)
(Continued)

(52) U.S. Cl.
CPC ........ *C08G 64/205* (2013.01); *B01F 27/1134* (2022.01); *B01F 27/86* (2022.01);
(Continued)

(58) Field of Classification Search
CPC .............. B01F 27/91; B01F 2215/0481; B01F 2215/0459; B01F 2215/0431;
(Continued)

(56) References Cited

U.S. PATENT DOCUMENTS

| 3,466,150 A | 9/1969 | Dietze et al. |
| 3,927,983 A | 12/1975 | Gordon et al. |

(Continued)

FOREIGN PATENT DOCUMENTS

| CN | 2486202 Y | 4/2002 |
| CN | 1972982 A | 5/2007 |

(Continued)

OTHER PUBLICATIONS

"Handbook of Industrial Mixing: Science and Practice"; Wiley—Interscience; 2004; pp. 357-358.
(Continued)

*Primary Examiner* — Anshu Bhatia
(74) *Attorney, Agent, or Firm* — CANTOR COLBURN LLP

(57) ABSTRACT

In an embodiment, a reactor for carrying out a melt transesterification reaction at a reactor temperature of 160 to 300° C. and a reactor pressure of 5 to 200 mbar, comprises a cylindrical tank comprising a top, a side, and a bottom, wherein the bottom is convex, extending away from the top; a stirring shaft disposed within the cylindrical tank along an axis thereof so that it is rotatable from outside of the cylindrical tank; an impeller extending from the stirring shaft in the cylindrical tank and comprising a plurality of blades; a reactant solution inlet; a reaction solution outlet; and an externally located heat exchanger in fluid communication with the cylindrical tank via a recirculation stream and a heated stream. The reactor can be used for the polymerization of a polycarbonate oligomer.

20 Claims, 5 Drawing Sheets

(51) Int. Cl.
*B01J 19/00* (2006.01)
*C08G 64/30* (2006.01)
*B01F 27/86* (2022.01)
*B01F 27/91* (2022.01)
*B01F 27/113* (2022.01)
*B01F 101/00* (2022.01)

(52) U.S. Cl.
CPC ........... *B01F 27/91* (2022.01); *B01J 19/0013* (2013.01); *B01J 19/0066* (2013.01); *C08G 64/305* (2013.01); *B01F 2101/2204* (2022.01); *B01F 2215/0422* (2013.01); *B01F 2215/0431* (2013.01); *B01F 2215/0459* (2013.01); *B01F 2215/0481* (2013.01); *B01J 2219/00768* (2013.01); *B01J 2219/1943* (2013.01)

(58) Field of Classification Search
CPC ........... B01F 2215/0422; B01J 19/0013; B01J 2219/00768; B01J 19/0066; C08G 64/305
See application file for complete search history.

(56) References Cited

U.S. PATENT DOCUMENTS

| | | | |
|---|---|---|---|
| 5,498,688 | A | 3/1996 | Oshino et al. |
| 6,458,916 | B1 | 10/2002 | Yamaguchi et al. |
| 8,017,713 | B2 | 9/2011 | Takahashi et al. |
| 8,785,565 | B2 | 7/2014 | Namiki et al. |
| 2006/0176771 | A1 | 8/2006 | Adams |
| 2009/0134173 | A1* | 5/2009 | Liang .................... C12M 27/02 220/563 |
| 2010/0243208 | A1 | 9/2010 | Kar et al. |
| 2013/0233393 | A1 | 9/2013 | Kageler |
| 2020/0171452 | A1 | 6/2020 | Fernandez et al. |

FOREIGN PATENT DOCUMENTS

| | | |
|---|---|---|
| CN | 101185864 A | 5/2008 |
| CN | 101642688 A | 2/2010 |
| CN | 201880499 U | 6/2011 |
| CN | 102580654 A | 7/2012 |
| CN | 102582654 A | 7/2012 |
| CN | 102702500 B | 3/2013 |
| CN | 102675619 B | 6/2013 |
| CN | 105252508 A | 12/2015 |
| CN | 205833150 U | 12/2016 |
| DE | 102012105296 | 12/2013 |
| EP | 1657272 A1 | 5/2006 |
| EP | 2692768 A1 | 5/2014 |
| JP | 5751724 A | 3/1982 |
| JP | 07292002 A | 11/1995 |
| JP | H09286850 A | 11/1997 |
| JP | H10176045 | 6/1998 |
| JP | 2003138001 | 5/2003 |
| JP | 2013213105 | 10/2013 |
| JP | 2015108048 | 6/2015 |
| JP | 2016079400 A | 5/2016 |
| WO | 0246267 A2 | 6/2002 |
| WO | 2005105890 A1 | 11/2005 |
| WO | 2012156916 A1 | 11/2012 |
| WO | 2016023857 A | 2/2016 |
| WO | 0076657 A1 | 12/2017 |
| WO | 2019003207 A1 | 1/2019 |

OTHER PUBLICATIONS

Xie et al.; "Chemical Machinery: Second Edition"; with English Translation; Chemical Industry Press; 1990; 9 pages.
International Search Report; International Application No. PCT/IB2018/054869; International Filing Date: Jun. 29, 2018; dated Oct. 25, 2018; 7 pages.
Written Opinion; International Application No. PCT/IB2018/054869; International Filing Date: Jun. 29, 2018; dated Oct. 25, 2018; 8 pages.
Tan; "Chemical Equipment Design Fundamentals (3rd Edition)"; with English abstract; Tianjin University Press; Aug. 2014; pp. 210-212.
Xie et al.; "Chemical Machinery (Second Edition)", Chemical Industry Press; 1990; pp. 256-257.

* cited by examiner

OLIGOMERISER WITH IMPROVED MIXING PERFORMANCE

CROSS REFERENCE TO RELATED APPLICATIONS

This application is a National Stage application of PCT/IB2018/054869, filed Jun. 29, 2018, which claims the benefit of European Application No. 17382425.1, filed Jun. 30, 2017, both of which are incorporated by reference in their entirety herein.

BACKGROUND

Polycarbonate is widely used in many engineering applications as it has excellent mechanical properties, such as impact resistance and heat resistance, and also has excellent transparency. In a typical method that is industrially used for producing polycarbonate, a bisphenol, such as Bisphenol A (BPA), and a carbonate precursor, such as diphenyl carbonate (DPC), are reacted in an ester exchange method in a molten state. This melt polymerization is often referred to as a melt polycondensation process or transesterification process. The resulting polycarbonate can be extruded or otherwise processed, and can be combined with additives such as dyes and UV stabilizers.

The melt polymerization process though is severely energy intensive and methods of reducing the overall amount of energy required are greatly desired. In particular, it is desirable to reduce the amount of operating and capital expenditure during at least one of the stages of the melt polymerization process.

BRIEF SUMMARY

Disclosed herein is an impeller reactor and uses thereof.

In an embodiment, a reactor for carrying out a melt transesterification reaction at a reactor temperature of 160 to 300° C. and a reactor pressure of 5 to 200 mbar, comprises a cylindrical tank comprising a top, a side, and a bottom, wherein the bottom is convex, extending away from the top; a stirring shaft disposed within the cylindrical tank along an axis thereof so that it is rotatable from outside of the cylindrical tank; an impeller extending from the stirring shaft in the cylindrical tank and comprising a plurality of blades that are each independently at an angle α from an orthogonal of the axis; a reactant solution inlet; a reaction solution outlet; and an externally located heat exchanger in fluid communication with the cylindrical tank via a recirculation stream and a heated stream.

In another embodiment, a method of melt polymerizing a polycarbonate, comprises adding a precursor solution comprising a polycarbonate precursor to the reactor of any one or more of the preceding embodiments through the reactant solution inlet; mixing and polymerizing the polycarbonate precursor at the reactor temperature of 160 to 300° C., preferably, 230 to 280° C., and the reactor pressure of 5 to 200 mbar to form a polycarbonate oligomer; and withdrawing a mixed solution comprising the polycarbonate oligomer having a weight average molecular weight that is greater than that of the polycarbonate precursor from the reaction solution outlet.

The above described and other features are exemplified by the following figures, detailed description, and claims.

BRIEF DESCRIPTION OF THE DRAWINGS

The figures are exemplary, non-limiting embodiments, where like elements are numbered alike. Several of the figures are illustrative of the examples, which are not intended to limit the disclosure to the materials, conditions, or process parameters set forth herein. The patent or application file contains at least one drawing executed in color. Copies of this patent or patent application publication with color drawing(s) will be provided by the Office upon request and payment of the necessary fee.

DETAILED DESCRIPTION

Melt polymerization is an industrially used process to make polycarbonate by reacting a bisphenol and a carbonate compound in the molten form. The bisphenol and the carbonate compound are added to a monomer mixing tank along with a quaternary catalyst, where some oligomerization starts, as is evidenced by production of a phenol byproduct. From the monomer mixing tank, the melt is added to a series of oligomerization units that use Maxblend type, flat blade impellers from Sumitomo Heavy Industries Process Equipment Co., Ltd. and internal heat exchanger coils. These oligomerization units require large amounts of power per unit of solution volume to operate and also suffer from associated scale-up challenges, especially in terms of meeting heat transfer requirements.

It was discovered that a reactor using a rotating impeller comprising a plurality of blades was capable of forming a polycarbonate oligomer using a reduced unit power as compared to a mixer using a flat blade impeller. For example, the present reactor can result in a more than 40% reduction in the unit power as compared to a mixer having the same capacity and using a flat blade impeller and an internal heat exchanger. The majority of the power reduction is achieved by using impellers with lower power numbers and a simplified internal configuration. It is believed that using the external heat exchanger will reduce the complexity of the reactor design as compared to a reactor with internal heating coils and will overcome the challenges associated with meeting the heat transfer requirements during scale-up of reactor design. The recirculation loop through the external heat exchanger can also help to reduce the mixing time of the reactor.

Figure 1:
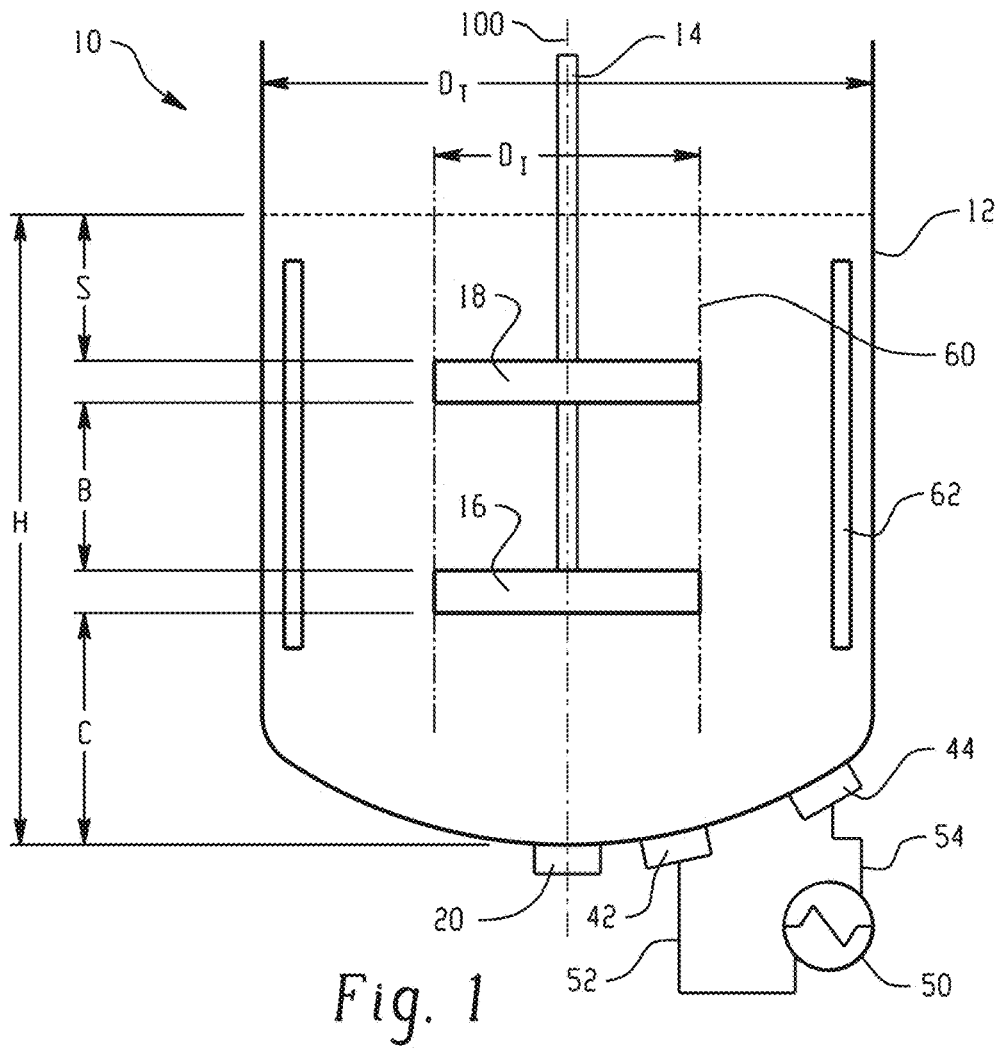
FIG. 1 is an illustration of an embodiment of an impeller reactor.

FIG. 1 is an illustration of an embodiment of an improved reactor. FIG. 1 illustrates that reactor 10 can comprise cylindrical tank 12 comprising a top, a side, and a bottom, wherein the bottom is convex, extending away from the top. The reactor can be a vertical reactor such that axis 100 is perpendicular (within 10°, or 0 to 5°, or 0 to 1°) to at least one of a plane tangent to the bottom of the cylindrical tank or a top fluid plane as defined by a top surface of a resting liquid present in the cylindrical tank (also referred to herein as a level fluid line). Stirring shaft 14 is disposed within cylindrical tank 12 along axis 100 thereof so that it is rotatable from outside of cylindrical tank 12. At least one impeller can extend from stirring shaft 14 in cylindrical tank 12 and can comprise a plurality of blades that are each independently at an angle α from the orthogonal of axis 100.

Externally located heat exchanger 50 can be in fluid communication with cylindrical tank 12 via recirculation stream 52 and a heated stream 54. The temperature of the heated stream, $T_f$, can be greater than a temperature of the recirculation stream, $T_i$, for example, $T_f$ can be greater than or equal to $T_i+10°$ C., or greater than or equal to $T_i+20°$ C., or greater than or equal to $T_i+50°$ C., optionally, less than or equal to $T_i+100°$ C. The externally located heat exchanger can impart a heat to the recirculation stream to effect a rise in temperature. All of the recirculation stream withdrawn from the cylindrical tank, for example, 99 to 100 wt % based on the total weight of the recirculation stream withdrawn, can be reintroduced to the cylindrical tank as the heated stream. One or both of the recirculation stream and the heated stream can be in the liquid form.

A mass flow rate of the recirculation stream entering the external heat exchanger can be equal to a mass flow rate of the heated stream exiting the external heat exchanger, for example, a mass flow rate of the heated stream can be within 5%, or within 1%, or within 0.1% of the mass flow rate of the recirculation stream. The heated stream upon entering the cylindrical tank can comprise, or can consist essentially of only the heated composition of the recirculation stream, i.e., it can be free of an additionally added component.

An overhead stream can be withdrawn from the cylindrical tank. The overhead stream can be in fluid communication with a separation unit, for example, a scrubber, a distillation column, a pressure condenser, or an absorption unit. The overhead stream can be in the gas form. The overhead stream can comprise at least one of an unreacted monomer (such as bisphenol A or diphenyl carbonate) or a reaction by-product (such as phenol). At least a portion of the unreacted monomer can be returned to the cylindrical reactor via a return stream.

Figure 2:
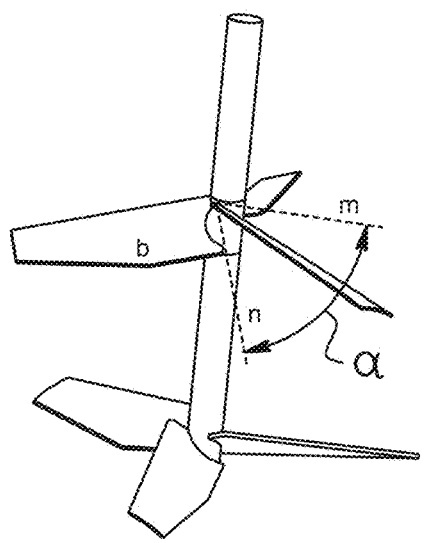
FIG. 2 is an illustration of an embodiment of a perspective view of an impeller.

At least one impeller, for example, 1 to 5, or 2 to 4, or 1 to 2 impellers can extend from the stirring shaft. For example, FIG. 1 and FIG. 2 illustrate a stirring shaft having two impellers, lower impeller 16 and upper impeller 18, extending therefrom. Each impeller independently comprises a plurality of blades that are each independently at an angle α from the orthogonal of axis 100, where the angle α is illustrated in FIG. 2 as the angle between line n that is along the face of blade b and line m is orthogonal to the axis 100. The angle α of each blade independently can be 25 to 65 degrees, or 30 to 50 degrees. The angle α of each blade can be the same, or within 1 degree of each other. Each impeller independently can be a hydrofoil impeller.

Figure 3:
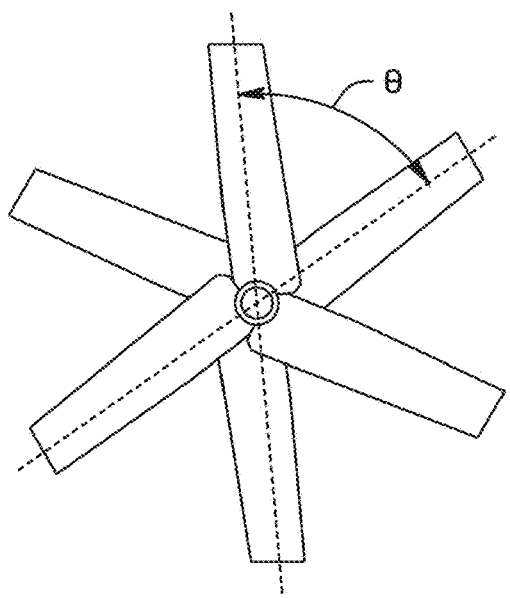
FIG. 3 is an illustration of an embodiment of a top-down, perspective view of an impeller.

Each impeller independently can comprise 2 to 5 blades, or 2 to 4 blades, or 3 blades. For example, each impeller can be a three-blade impeller. When two or more impellers extend from the stirring shaft, for example, lower impeller 16 and upper impeller 18, the respective impellers can be offset by an angle θ of 50 to 70 degrees, where the angle θ is the angle between a first blade on the lower impeller relative to a first blade on the second impeller that is encountered in a radial trajectory is illustrated in FIG. 3.

Figure 7:
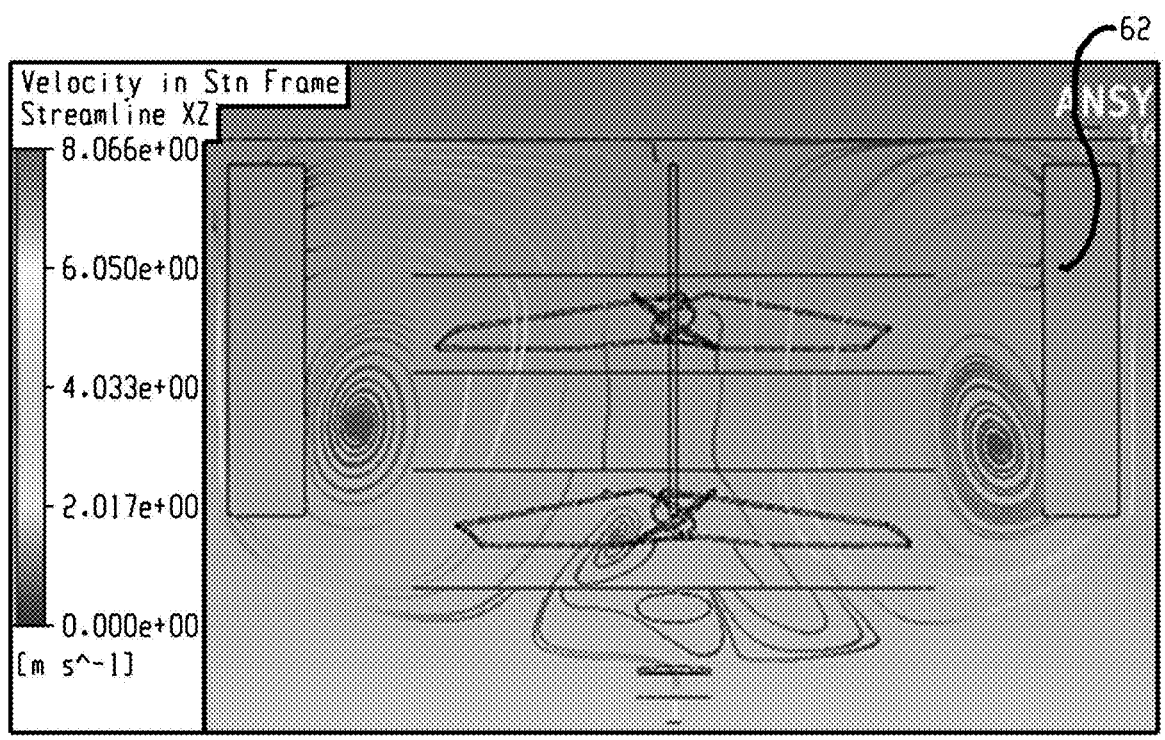
FIG. 7 is an illustration of the computational fluid dynamics evaluation of the stream lines of Example 1.
Figure 11:
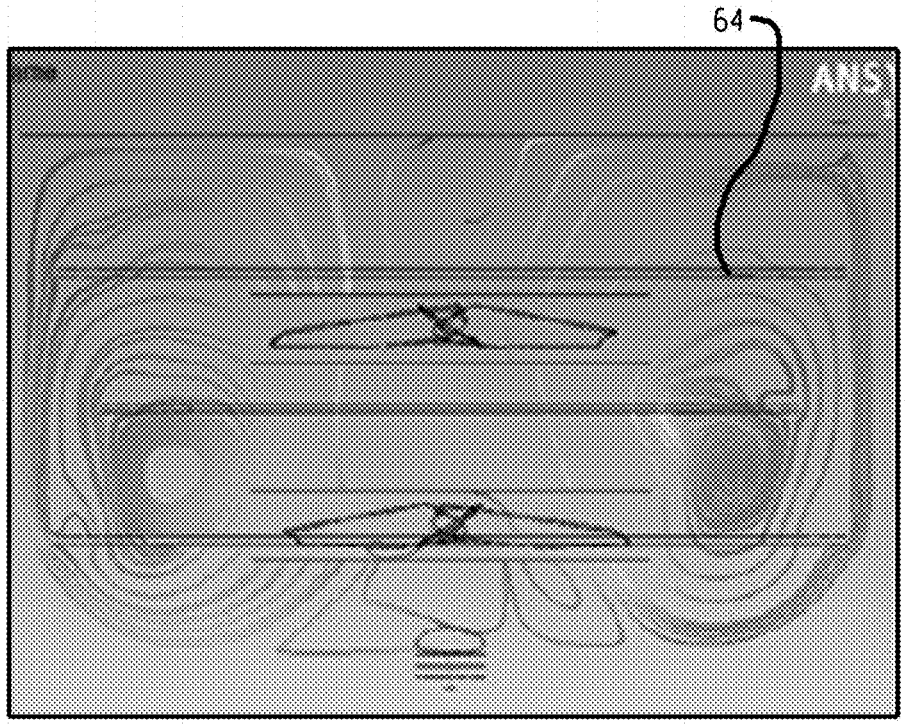
FIG. 11 is an illustration of the computational fluid dynamics evaluation of the stream lines of Example 4.

The impeller, for example, a hydrofoil impeller, can produce an axial flow pattern. As used herein, the axial flow pattern refers to the fluid flow flowing in the direction of the stirring shaft towards the bottom of the tank, flowing from the bottom of the tank towards the side of the tank, and flowing upwards along the side of the tank to form a complete circulation loop. A good axial flow pattern can ensure that there are no dead pockets or poorly mixed zones in the reactor and can provide a good volumetric renewal rate to ensure the produced phenol leaves the reactor. FIG. 7 and FIG. 11 illustrate examples of axial flow patterns achieved by the reactor.

When two or more impellers extend from the stirring shaft, for example, lower impeller 16 and upper impeller 18, the respective impellers can direct a fluid flow in the same direction, for example, toward the bottom of the cylindrical tank. This similar directionality can help to achieve an axial flow pattern of the mixing solution.

The impeller can have a power number of less than or equal to 2, or less than or equal to 1, or 0.25 to 1. The power number is a dimensionless parameter used for estimating the power consumed by the agitating impeller in a cylindrical tank. The power number, $N_P$, defined as $P_u/(\rho n^3 D_I^5)$, where $P_u$ the power input per volume of the reaction mixture (also referred to herein as the unit power) in watts per meter cubed (W/m³), ρ is the density of the solution in kilograms per meter cubed (kg/m³), n is the impeller speed in revolutions per second (1/s), and $D_I$ is the impeller diameter in meters (m). When only one impeller is located on the stirring shaft, the power number can be 0.25 to 0.5. When two impellers are located on the stirring shaft, the respective power numbers can be 0.5 to 1.

The impeller can have a flow number of less than or equal to 2, or less than or equal to 1, or 0.25 to 1. The flow number is a dimensionless parameter used for estimating the fluid movement resulting from the agitating impeller in a cylindrical tank. The flow number, Nq, is defined as $Q/(nD_I^3)$, where Q is the volumetric flow rate of the discharge stream directly from the impeller in meters cubed per second (m³/s), and n and $D_I$ are defined as above. The flow number can be 0.1 to 1, or 0.4 to 0.7 for each impeller independently.

A total volume of the cylindrical tank can be greater than or equal to 10 meters cubed (m³), or 20 to 100 m³, or 20 to 50 m³. The cylindrical tank can hold greater than or equal to 20,000 liters (L), or 20,000 to 50,000 L of liquid. The cylindrical tank can have an inner reactor diameter, $D_T$, of 1 to 10 meters (m), or 2 to 5 m. The cylindrical tank can be defined by various lengths. For example, FIG. 1 illustrates that length C can be a length from a lowest point in the cylindrical tank 12 to a lowest point on the lower impeller 16, length $D_{IL}$ can be two times the length of a blade of the lower impeller 16, length S can be a length from level fluid line to a highest point of the upper impeller 18, and length $D_{IU}$ can be two times the length of the blades of the upper impeller 18. These lengths are illustrated in FIG. 1. It is noted that if there is only one impeller, then the one impeller is both the lower impeller and the upper impeller and both $D_{IL}$ and $D_{IU}$ would be equal to $D_I$, for example, two times the length of the blades of the impeller. A ratio of $C:D_{IL}$ can be 0.05 to 0.5; or 0.1 to 0.2. A ratio of $S:D_{IU}$ can be 0.1 to 2; 0.1 to 1.

Figure 4:
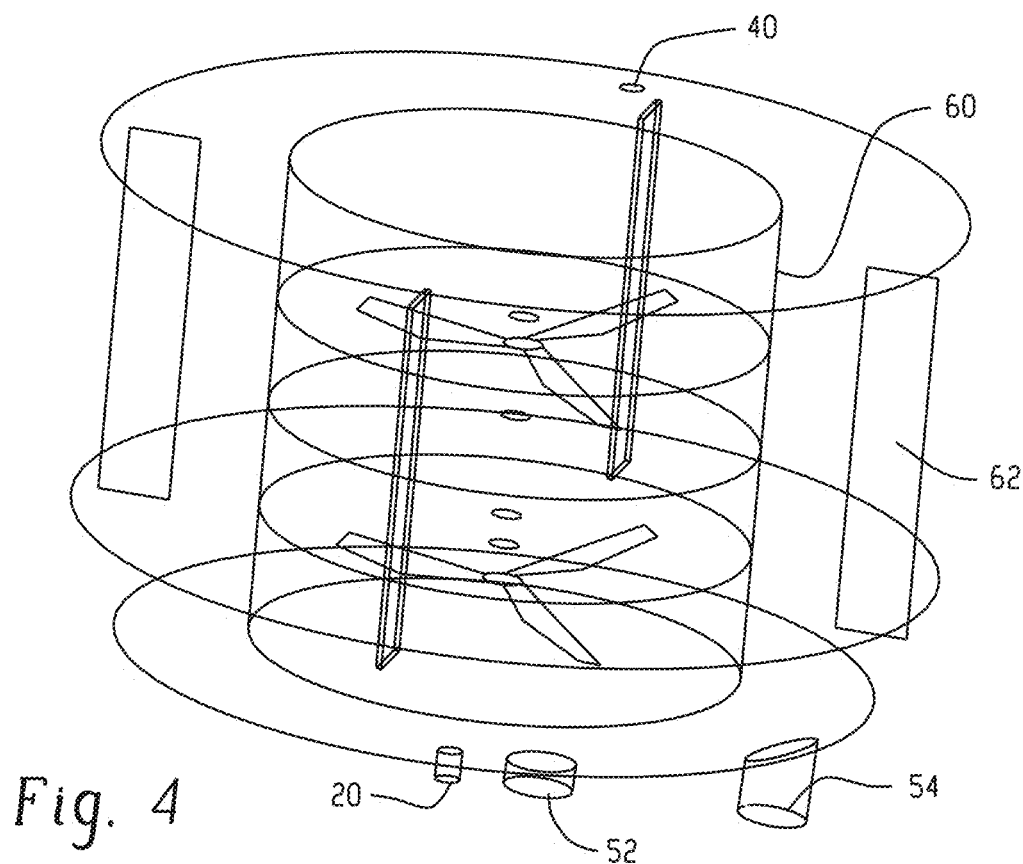
FIG. 4 is an isometric illustration of an embodiment of an impeller reactor having vertical baffles.
Figure 5:
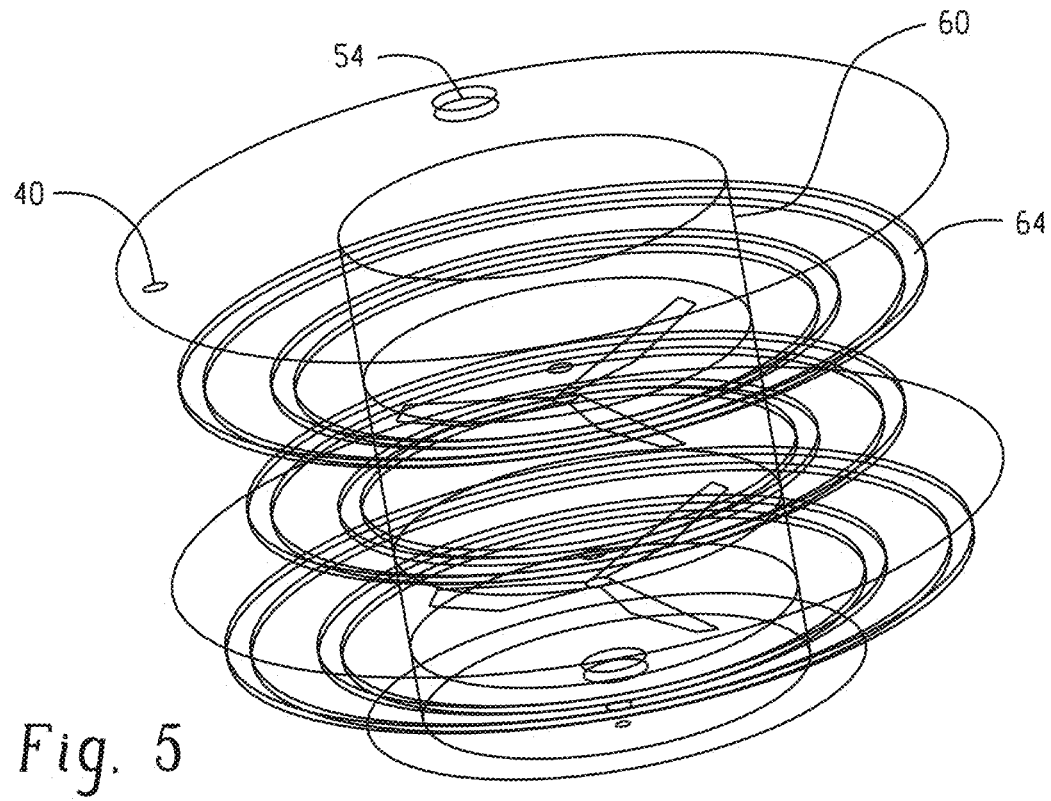
FIG. 5 is an isometric illustration of an embodiment of an impeller reactor having circular baffles.

A reactant solution inlet can be located on the top of the cylindrical tank. A reactant solution inlet can be located on the side of the cylindrical tank. A reactant solution inlet can be located on the bottom of the cylindrical tank. FIG. 4 and FIG. 5 illustrate reactant solution inlet 40 located on the side of the cylindrical tank. The reactant solution inlet can allow for a polycarbonate precursor solution to be added to the reactor. One or both of additional catalyst and additional monomer can be added to the reactor through the same or through a different inlet.

A reaction solution outlet can be located on the side of the cylindrical tank. A reaction solution outlet can be located on the bottom of the cylindrical tank. If located on the bottom of the cylindrical tank, the reaction solution outlet can be concentrically located on a central axis of the cylindrical tank. For example, FIG. 1 illustrates reaction solution outlet 20 concentrically located on axis 100 of cylindrical tank 12.

The reactant solution inlet can be in fluid communication with the externally located heat exchanger. For example, a heated stream leaving the externally located heat exchanger can be combined with a solution stream upstream of the reactant solution inlet and added as a combined stream.

Conversely, the heated stream can be added to the cylindrical tank through a recirculation inlet that is different from the reactant solution inlet. The recirculation inlet can be located on the top of the cylindrical tank. The recirculation inlet can be located on the side of the cylindrical tank. The recirculation inlet can be located on the bottom of the cylindrical tank. FIG. 1 illustrates that recirculation inlet 44 can be in fluid communication with externally located heat exchanger 50 via heated stream 54.

The reaction solution outlet can be in fluid communication with the externally located heat exchanger. For example, a mixed solution stream exiting the reaction solution outlet can be split (for example, using a Y-junction or a T-junction) into at least two streams, where one of the streams is a recirculation stream that connects to the externally located heat exchanger.

Conversely, the recirculation stream can exit the cylindrical tank via a recirculation outlet that is separate from the reaction solution outlet. The recirculation outlet can be located on the side of the cylindrical tank. The recirculation outlet can be located on the bottom of the cylindrical tank. FIG. 1 illustrates that recirculation outlet 42 can be in fluid communication with externally located heat exchanger 50 via recirculation stream 52.

The cylindrical tank can comprise a reactant solution inlet, a reaction solution outlet, a recirculation inlet, and a recirculation outlet. Both the recirculation inlet and the recirculation outlet can be located on the bottom of the cylindrical tank. The recirculation outlet can be located on the bottom of the cylindrical tank and the recirculation inlet can be located on the side of the cylindrical tank. The cylindrical tank can comprise a reactant solution inlet, a reaction solution outlet, and a recirculation inlet, where the reaction solution outlet is in fluid communication with both a second reactor via a mixed solution stream and the externally located heat exchanger via recirculation stream 52.

The reactor comprises a heat exchanger that is located external to the cylindrical tank and is referred to as the externally located heat exchanger. The externally located heat exchanger can comprise 1 or more externally located heat exchangers. When two or more externally located heat exchangers are present, the externally located heat exchangers can be configured in series and/or in parallel with each other. The cylindrical tank can be free of an internally located heat exchanger that is located inside the cylindrical tank, for example, internally located heating coils. Heating can be done through a reactor jacket. In other words, the heat management can be performed either through a reactor jacket and/or through an externally located heat exchanger. The reactor can comprise a heating jacket in physical contact with at least a portion of the outside wall of the cylindrical tank and also an externally located heat exchanger 50, for example, as illustrated in FIG. 1.

A plurality of baffles can be located in the cylindrical tank. The plurality of baffles can comprise one or both of vertical baffles and circular baffles. The vertical baffles can be flat plate baffles vertically positioned in the tank such that the height (the longest side) of the flat plate baffles is parallel to the flat height of the side of the tank (or parallel to the impeller shaft axis) and the width (the shortest side) is perpendicular to a tangent of the round side of the cylindrical tank. The plurality of baffles can comprise 2 to 10, or 3 to 5 vertical baffles. FIG. 4, FIG. 6, FIG. 7, and FIG. 8 are illustrations of a cylindrical reactor that comprises 4 vertical baffles 62.

Figure 10:
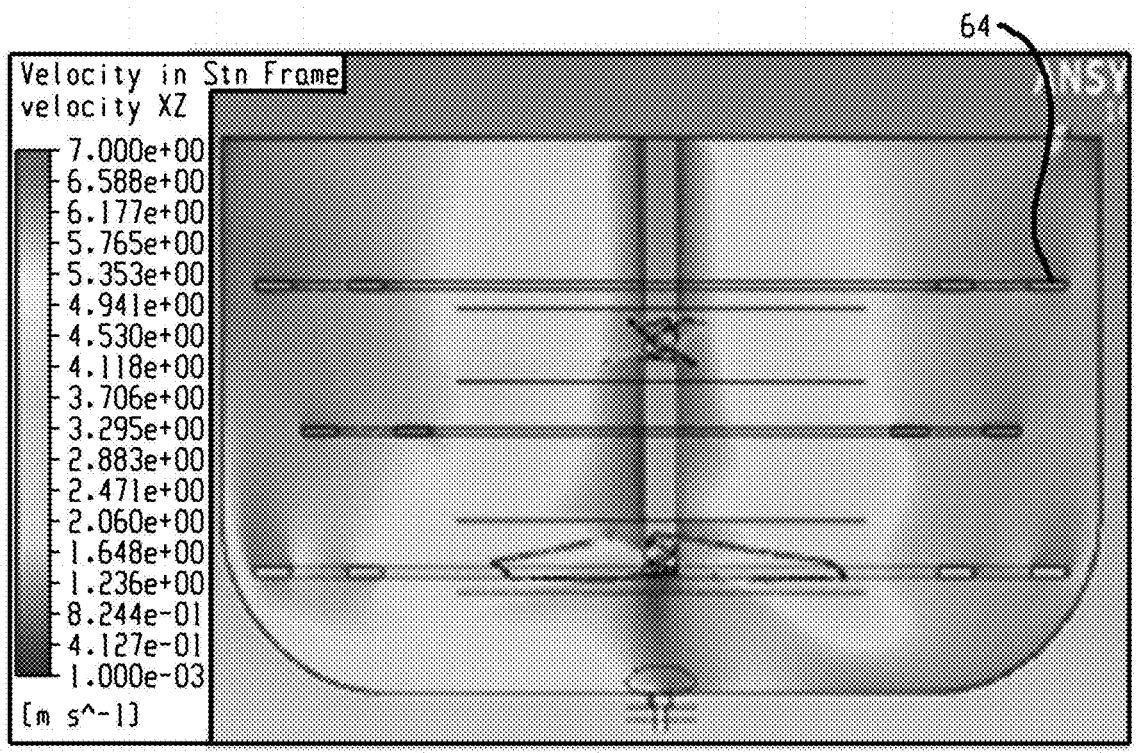
FIG. 10 is an illustration of the computational fluid dynamics evaluation of the velocity contours of Example 4.

The plurality of baffles can comprise 2 to 15, or 4 to 12, or 4 to 8 circular baffles. FIG. 5, FIG. 10, and FIG. 11 are illustrations of a cylindrical reactor that comprises 6 circular baffles 64. An inner diameter of all of the circular baffles can be greater than or equal to $D_f$. In other words, a rotation column defined by the rotation of the impeller, as illustrated in FIG. 5 as rotation column 60, can be free of the circular baffles 64. The presence of the circular baffles can result in a beneficial decrease in the mixing time.

The reactor can be used to prepare a polycarbonate oligomer from a precursor solution. The precursor solution comprising the polycarbonate precursor can be formed in a monomer mixing unit. The monomer mixing unit can be maintained at atmospheric pressure and at a temperature of 100 to 250° C., or 150 to 200° C., or 165 to 185° C. The polycarbonate precursor can comprise a carbonate precursor, a bisphenol, a catalyst, and optionally a low molecular weight oligomer. The bisphenol and the carbonate precursor in the precursor solution can be present in a molar ratio of 0.5:1 to 1.5:1, or 0.9:1 to 1.1:1, or 0.99:1 to 1.01:1.

The method of mixing a precursor solution in the reactor, can comprise adding the precursor solution comprising a polycarbonate precursor to the reactor through a reactant solution inlet; mixing and polymerizing the polycarbonate precursor at a reactor temperature and a reactor pressure to form a polycarbonate oligomer; and withdrawing a mixed solution comprising the polycarbonate oligomer having a weight average molecular weight that is greater than that of the polycarbonate precursor from a reaction solution outlet. The method can comprise removing a recirculation stream from the cylindrical reactor, flowing the recirculation stream through an externally located heat exchanger to form a heated stream, and reintroducing the heated stream to the cylindrical reactor. The reactor temperature can be 160 to 300 degrees Celsius (° C.), or 160 to 280° C., or 140 to 240° C., or 200 to 270° C., or 275 to 300° C. The reactor pressure can be 5 to 200 millibar absolute (mbar), or 30 to 200 mbar, or 2 to 25 mbar. The average residence time of the precursor solution in the reactor can be greater than or equal to a comparison average residence time of the precursor solution added to a same reactor but through a side feeder. The average residence time of the precursor solution in the reactor can be 0.1 to 15 hours.

Figure 8:
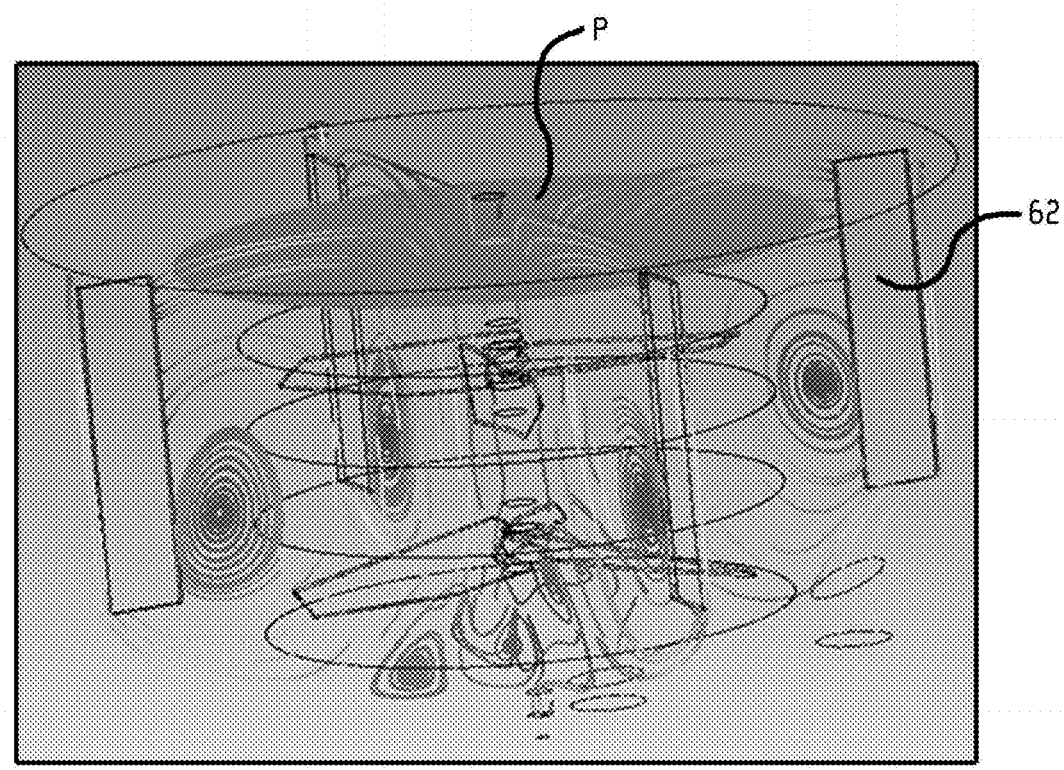
FIG. 8 is an isometric illustration of the computational fluid dynamics evaluation of the stream lines of Example 1.

The mixing can result in the formation of an axial flow pattern, for example, as illustrated in FIG. 7 and FIG. 11. The mixing can occur at a rotation speed of the stirring shaft 14 of 40 to 100 revolutions per minute (rpm). The mixing can achieve a normalized surface refresh rate of greater than or equal to 0.03 inverse seconds ($s^{-1}$), or 0.04 to 0.4 $s^{-1}$, or 0.06 to 0.1 $s^{-1}$. As used herein, the normalized surface refresh rate is the volume of solution that passes across a plane located 200 millimeters (mm) below the liquid surface level per second per total volume of solution in the reactor ($m^3/s \cdot m^3$ or $s^{-1}$). An example of plane, P, is illustrated in FIG. 8.

The mixing time can be less than or equal to 60 seconds (s), or 20 to 50 s. The reactor can comprise a plurality of circular baffles and the mixing time can be 20 to 40 s, or 20 to 30 s.

The mixed solution can have a mixed solution viscosity that is greater than a precursor solution viscosity of the precursor solution. For example, the precursor solution can have a precursor solution viscosity that is less than or equal to 0.05 Pascal seconds (Pa·s) and the mixed solution can have a mixed solution viscosity of greater than or equal to 0.05 Pa·s, or greater than or equal to 0.5 Pa·s, or 0.05 to 0.5 Pa·s, or greater than or equal to 2.5 Pa·s, or 0.15 to 10 Pa·s, or 0.5 to 10 Pa·s. As used herein, the viscosity is determined using a parallel plate rheometer, AR-G2 from TA Instruments, using 25 mm diameter plates having a 0.5 mm gap between the plates. The measurements are made at a temperature of 250 to 300° C. and varying frequency from 100 and 1000 $s^{-1}$.

When the reactor is used in a melt polycarbonate polymerization plant, it can be used as an oligomerization reactor (also referred to as an oligomeriser). The oligomerization reactor can be in series with two or more oligomerizers. One or more of the oligomerisers can have an impeller mixer. For example, in a melt polymerization (also referred to herein as a melt transesterification reaction), the reactor can be a first reactor, the reactant solution inlet of the first reactor can be in fluid communication with a monomer mixing tank, the reaction solution outlet of the first reactor can be in fluid communication with a second reactor inlet of a second reactor, and a second reactor outlet of the second reactor can be in fluid communication with a polymerization reactor. The first reactor can have two impellers (for example, two hydrofoil impellers) located on the stirring shaft of the first reactor and the second reactor can have one impeller (for example, one hydrofoil impeller) located on the stirring shaft of the second reactor. The fluid flow in the first reactor can be turbulent flow and the first reactor can have a normalized surface refresh rate of 0.04 to 0.4 $s^{-1}$, or 0.06 to 0.1 $s^{-1}$. The fluid flow in the second reactor can be laminar flow and the second reactor can have a normalized surface refresh rate of 0.04 to 0.4 $s^{-1}$, or greater than 0.04 to less than 0.4 $s^{-1}$.

The mixed solution can be added to a second reactor and the method can comprise adding the mixed solution to the second reactor, mixing and further polymerizing the mixed solution at a second temperature greater than the reactor temperature and a second pressure less than the reactor pressure, and withdrawing an oligomer solution comprising a high molecular weight polycarbonate oligomer having a weight average molecular weight that is greater than that of the polycarbonate oligomer. For example, the high molecular weight polycarbonate oligomer can have a weight average molecular weight of 1.5 to 15 kilodaltons, or 8 to 12 kilodaltons, 8 to 20 kilodaltons based on polycarbonate standards. The high molecular weight polycarbonate oligomer can have a viscosity of 1 to 10 Pa·s. The high molecular weight polycarbonate oligomer can then be polymerized in one or more polymerization vessels, for example, one or more wire wetting fall polymerization units, horizontal polymerizers, vertical polymerizers, reactive extruders, or a continuously stirred tanks.

The second reactor can comprise a second cylindrical tank comprising a second top, a second side, and a second bottom, wherein the second bottom is convex, extending away from the second top; a second stirring shaft disposed within the second cylindrical tank along a second axis thereof so that it is rotatable from outside of the second cylindrical tank; a second impeller extending from the second stirring shaft in the second cylindrical tank and comprising a second plurality of blades that are each independently at a second angle α from a second orthogonal of the second axis; a second reactant solution inlet; a second reaction solution outlet; and a second externally located heat exchanger in fluid communication with the second cylindrical tank via a second recirculation stream and a second heated stream. It is noted that the term "second" is used for clarity to distinguish from the "first" reactor and that the term "downstream" could likewise be used.

The first reactor temperature can be 160 to 300° C., or 160 to 275° C., or 160 to 250° C., or 200 to 270° C., or 230 to 270° C. The first reactor pressure can be 50 to 200 mbar, or 75 to 200 mbar. The mixed solution viscosity can be 0.05 to 1 Pa·s, or 0.05 to 0.5 Pa·s. The second reactor temperature can be 250 to 300° C., or 270 to 300° C. The second reactor pressure can be 5 to 50 mbar, or 10 to 40 mbar. The oligomer solution viscosity can be 0.5 to 10 Pa·s, or 1 to 5 Pa·s, or greater than or equal to 1 Pa·s.

After polymerization, the polycarbonate can be extruded in an extruder where an optional quencher and an additive can be added to the molten polycarbonate. The extruder can be a twin-screw extruder and at least one of the components can be incorporated into the composition by feeding directly into the extruder at the throat and/or downstream of the throat through, for example, a side stuffer.

The carbonate precursor can comprise a diaryl carbonate ester, for example, diphenyl carbonate or an activated diphenyl carbonate having electron-withdrawing substituents on each aryl, for example, at least one of bis(4-nitrophenyl) carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, or bis(4-acetylphenyl) carboxylate. The diaryl carbonate ester can be free of an activated diphenyl carbonate having electron-withdrawing substituents on each aryl. For example, the diaryl carbonate ester can be free of bis(4-nitrophenyl)carbonate, bis(2-chlorophenyl)carbonate, bis(4-chlorophenyl)carbonate, bis(methyl salicyl)carbonate, bis (4-methylcarboxylphenyl) carbonate, bis(2-acetylphenyl) carboxylate, and bis(4-acetylphenyl) carboxylate. The diaryl carbonate ester can be free of bis(methyl salicyl)carbonate. As used herein, "can be free of" refers to none of the compounds being added in the melt polymerization, for example, less than or equal to 10 ppm, for example, 0 ppm of the compound being present. The carbonate precursor can comprise diphenyl carbonate.

The bisphenol can comprise a dihydroxy compound of the formula HO—$R^1$—OH, wherein the $R^1$ group can contain an aliphatic, an alicyclic, or an aromatic moiety. For example, the bisphenol can have the formula (2)

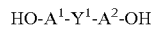

$$\text{HO-A}^1\text{-Y}^1\text{-A}^2\text{-OH} \qquad (2)$$

wherein each of $A^1$ and $A^2$ is a monocyclic divalent aromatic group and $Y^1$ is a single bond or a bridging group having one or more atoms that separate $A^1$ from $A^2$. One atom can separate $A^1$ from $A^2$.

The bisphenol can have the formula (3)

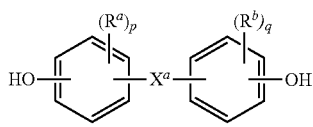
(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically, para) to each other on the $C_6$ arylene group. The bridging group $X^a$ can be single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms, for example, halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. p and q can each be 1, and $R^a$ and $R^b$ are each a $C_{1-3}$ alkyl group, specifically, methyl, disposed meta to the hydroxy group on each arylene group.

$X^a$ can be a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

$X^a$ can be a $C_{1-18}$ alkylene group, a $C_{3-18}$ cycloalkylene group, a fused $C_{6-18}$ cycloalkylene group, or a group of the formula —B$^1$-G-B$^2$— wherein B$^1$ and B$^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

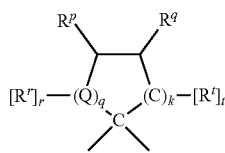
(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. Two adjacent groups (e.g., $R^q$ and $R^t$ taken together) can form an aromatic group or $R^q$ and $R^t$ taken together can form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing bisphenols can also be used. The bisphenol can comprise bisphenol A, in which each of A$^1$ and A$^2$ can be p-phenylene, and Y$^1$ can be isopropylidene in formula (3).

The resultant "polycarbonate" as used herein is derived from the carbonate compound and the bisphenol and can have repeating structural carbonate units of formula (1)

(1)

in which the R$^1$ groups contain aliphatic, alicyclic, and/or aromatic moieties (e.g., greater than or equal to 30 percent, specifically, greater than or equal to 60 percent, of the total number of R$^1$ groups can contain aromatic moieties and the balance thereof are aliphatic, alicyclic, or aromatic). Optionally, each R$^1$ can be a $C_{6-30}$ aromatic group that can contain at least one aromatic moiety. R$^1$ can be derived from the bisphenol.

The precursor solution can comprise at least one of a quaternary compound or an alkali catalyst. The precursor solution can comprise a quaternary compound and an alkali catalyst can be added to the reactor as a separate catalyst stream.

The quaternary catalyst comprises at least one of a quaternary ammonium compound or a quaternary phosphonium compound. The quaternary ammonium compound can be a compound of the structure (R$^4$)$_4$N$^+$X$^-$, wherein each R$^4$ is the same or different, and is a $C_{1-20}$ alkyl, a $C_{4-20}$ cycloalkyl, or a $C_{4-20}$ aryl; and X$^-$ is an organic or inorganic anion, for example, a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, and tetrabutyl ammonium acetate.

The quaternary phosphonium compound can be a compound of the structure (R$^5$)$_4$P$^+$X$^-$, wherein each R$^5$ is the same or different, and is a $C_{1-20}$ alkyl, a $C_{4-20}$ cycloalkyl, or a $C_{4-20}$ aryl; and X$^-$ is an organic or inorganic anion, for example, a hydroxide, phenoxide, halide, carboxylate, for example, acetate or formate, sulfonate, sulfate, formate, carbonate, or bicarbonate. Where X$^-$ is a polyvalent anion, for example, carbonate or sulfate, it is understood that the positive and negative charges in the quaternary ammonium and phosphonium structures are properly balanced. For example, where R$^{20}$ to R$^{23}$ are each methyls and X$^-$ is carbonate, it is understood that X$^-$ represents 2(CO$_3^{-2}$).

Examples of organic quaternary phosphonium compounds include tetramethyl phosphonium hydroxide, tetramethyl phosphonium acetate, tetramethyl phosphonium formate, tetrabutyl phosphonium hydroxide, tetraethyl phosphonium acetate, tetrapropyl phosphonium acetate, tetrabutyl phosphonium acetate (TBPA), tetrapentyl phosphonium acetate, tetrahexyl phosphonium acetate, tetraheptyl phosphonium acetate, tetraoctyl phosphonium acetate, tetradecyl phosphonium acetate, tetradodecyl phosphonium acetate, tetratolyl phosphonium acetate, tetramethyl phosphonium benzoate, tetraethyl phosphonium benzoate, tetrapropyl phosphonium benzoate, tetraphenyl phosphonium benzoate, tetraethyl phosphonium formate, tetrapropyl phosphonium formate, tetraphenyl phosphonium formate, tetramethyl phosphonium propionate, tetraethyl phosphonium propionate, tetrapropyl phosphonium propionate, tetramethyl phosphonium butyrate, tetraethyl phosphonium butyrate, tetrapropyl phosphonium butyrate, tetraphenyl phosphonium acetate (TPPA), and tetraphenyl phosphonium phenoxide (TPPP). The quaternary catalyst can comprise at least one of tetrabutyl phosphonium acetate, TPPP, or TPPA.

The amount of the quaternary catalyst can be added based upon the total number of moles of bisphenol employed in the polymerization reaction. When referring to the ratio of catalyst, for example, phosphonium salt, to all bisphenols employed in the polymerization reaction, it is convenient to refer to moles of phosphonium salt per mole of the bisphenol(s), meaning the number of moles of phosphonium salt divided by the sum of the moles of each individual bisphenol present in the reaction mixture. The amount of the optional quaternary catalyst (e.g., organic ammonium or phosphonium salts) can each independently be employed in an amount of $1\times10^{-2}$ to $1\times10^{-5}$, or $1\times10^{-3}$ to $1\times10^{4}$ moles per total mole of the bisphenol(s) in the monomer mixture.

The alkali catalyst comprises a source of one or both of alkali ions and alkaline earth ions. The sources of these ions can include alkaline earth hydroxides, for example, magnesium hydroxide and calcium hydroxide. Sources of alkali metal ions can include the alkali metal hydroxides, for example, at least one of lithium hydroxide, sodium hydroxide, or potassium hydroxide. Examples of alkaline earth metal hydroxides are calcium hydroxide and magnesium hydroxide. The alkali catalyst can comprise sodium hydroxide. Other possible sources of alkaline earth and alkali metal ions include salts of carboxylic acids (for example, sodium acetate) or derivatives of ethylene diamine tetraacetic acid (EDTA) (for example, EDTA tetrasodium salt, and EDTA magnesium disodium salt). For example, the alkali catalyst can comprise at least one of an alkali metal salt(s) of a carboxylic acid or an alkaline earth metal salt(s) of a carboxylic acid. In another example, the alkali catalyst comprises $Na_2Mg$ EDTA or a salt thereof.

The alkali catalyst can also, or alternatively, comprise salt(s) of a non-volatile inorganic acid. For example, the alkali catalyst can comprise salt(s) of a non-volatile inorganic acid, for example, at least one of $NaH_2PO_3$, $NaH_2PO_4$, $Na_2HPO_3$, $KH_2PO_4$, $CsH_2PO_4$, or $Cs_2HPO_4$. Alternatively, or in addition, the alkali catalyst can comprise mixed alkali metal salt(s) of phosphoric acid, for example, at least one of $NaKHPO_4$, $CsNaHPO_4$, or $CsKHPO_4$. The alkali catalyst can comprise $KNaHPO_4$, wherein a molar ratio of Na to K is 0.5 to 2.

The alkali catalyst typically can be used in an amount sufficient to provide $1\times10^{-2}$ to $1\times10^{-8}$ moles, or $1\times10^{-4}$ to $1\times10^{-7}$ moles of metal hydroxide per mole of the bisphenol(s).

Quenching of the transesterification catalysts and any reactive catalyst residues with an acidic compound after polymerization can be completed can also be useful in some melt polymerization processes. Among the many quenchers that can be used are alkyl sulfonic esters of the formula $R^8SO_3R^9$ wherein $R^8$ is hydrogen, $C_{1-12}$ alkyl, $C_{6-18}$ aryl, or $C_{7-19}$ alkylaryl, and $R^9$ is $C_{1-12}$ alkyl, $C_{6-18}$ aryl, or $C_{7-19}$ alkylaryl. Examples of quenchers include benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate, and phenyl p-toluenesulfonate. In particular, the quencher can comprise an alkyl tosylate, for example, n-butyl tosylate.

The following examples are provided to illustrate the impeller reactor. The examples are merely illustrative and are not intended to limit devices made in accordance with the disclosure to the materials, conditions, or process parameters set forth therein.

EXAMPLES

Example 1

Flow Evaluation of an Impeller Reactor

A computational fluid dynamics evaluation of fluid flow in a reactor having an upper impeller and a lower impeller was performed using ANSYS CFD software. In the evaluation, a reactor as illustrated in FIG. 1 having 4 vertical baffles and the heating loop was modelled, with the parameters listed in Table 1.

TABLE 1

| Design Parameter | Value |
| --- | --- |
| Liquid volume (L) | 22,360 |
| Liquid Level, fluid height/$D_T$ | 0.61 |
| $D_I/D_T$ ratio | 0.55 |
| Impeller speed (RPM) | 60 |
| Number of impellers | 2 |
| Type of impeller | Hydrofoil |
| Baffles type | Vertical |
| Number of baffles | 4 |
| Baffle width (m) | 0.316 |
| Baffle clearance (m) | 0.063 |
| $C/D_{IL}$ Ratio | 0.15 |
| $S/D_{IU}$ Ratio | 0.5 |
| Mass flow (kg/h) | 29,596 |
| Recirculation flow (kg/h) | 592,310 |
| Temperature (° C.) | 258 |
| Density (kg/m$^3$) | 1040 |
| Viscosity (cP) | 150 |

Figure 6:
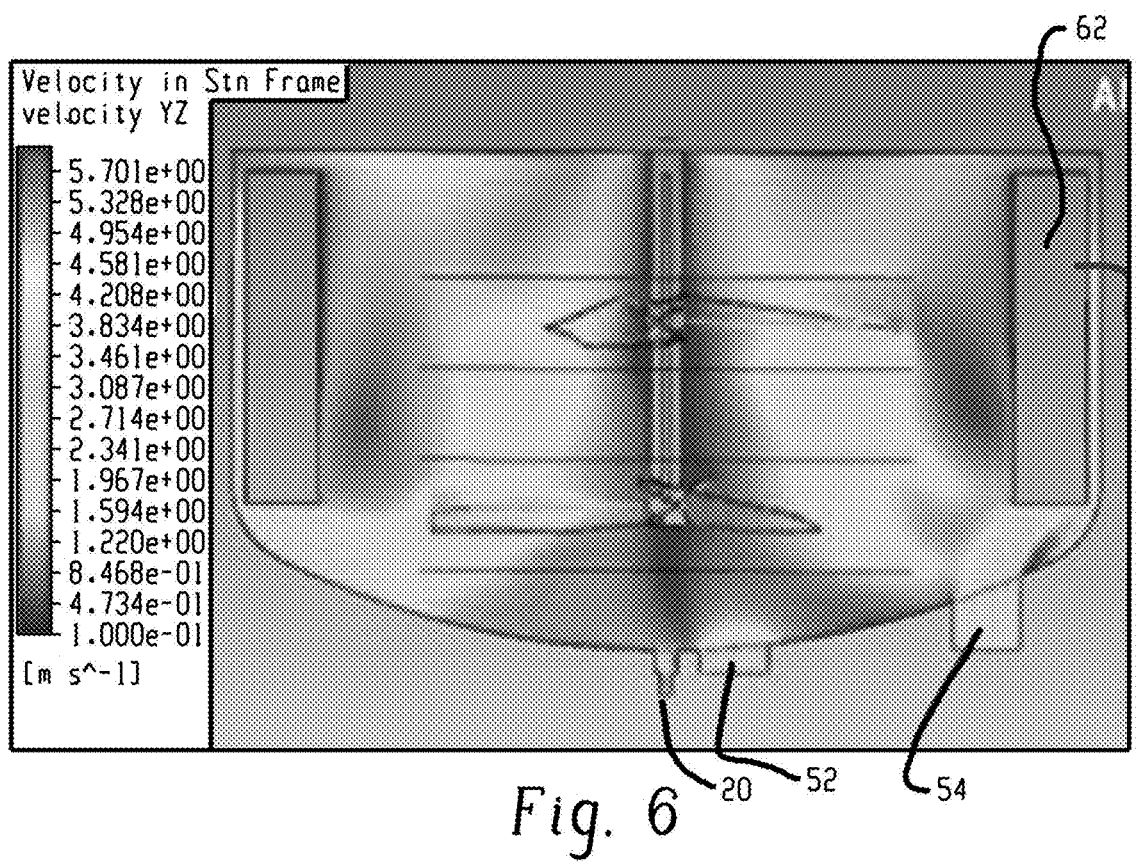
FIG. 6 is an illustration of the computational fluid dynamics evaluation of the velocity contours of Example 1.

The resulting flow pattern is shown in FIG. 6 that illustrates the resulting velocity contours as well as in FIG. 7 and FIG. 8 that illustrate the resulting stream lines. These figures illustrate the presence of a single axial flow loop and that good mixing is achieved in the impeller mixer. FIG. 8 further illustrates Plane, P, located 200 mm below the surface of the solution. The software determined that there was a normalized surface refresh rate through this surface of 0.072 s$^{-1}$. It is noted that the normalized surface refresh rate of 0.072 s$^{-1}$ is greater than the target volumetric surface refresh rate of 0.07 s$^{-1}$.

Examples 2-3

Residence Time Evaluation

Figure 9:
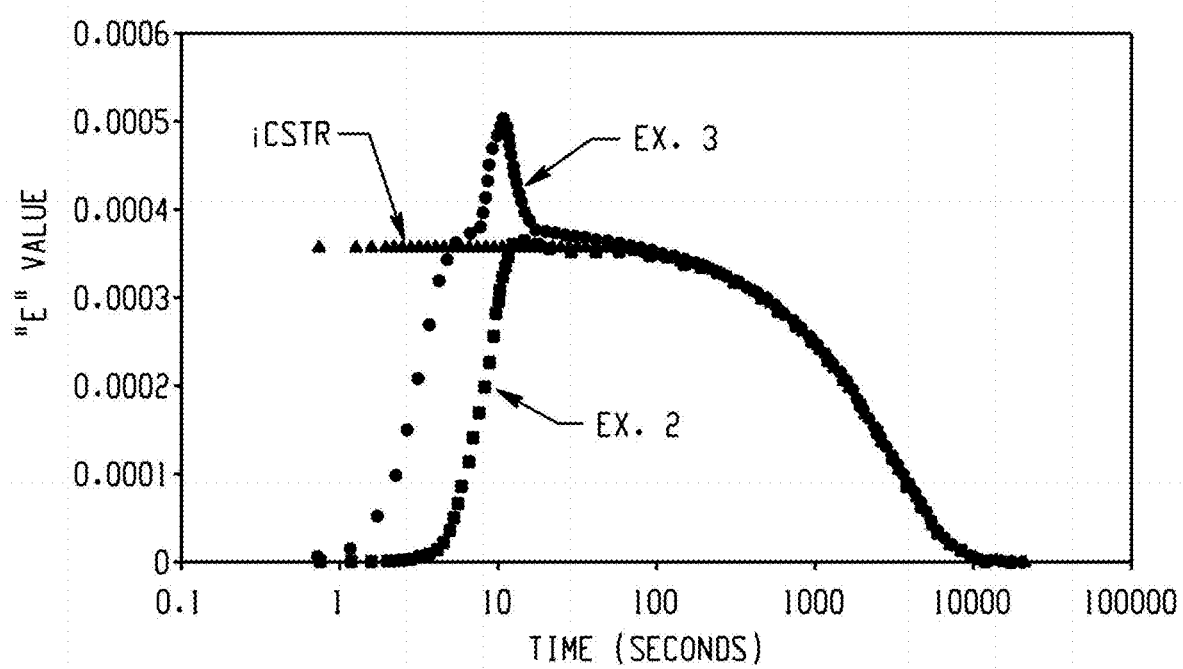
FIG. 9 is a graphical illustration of the residence time distribution of Examples 2 and 3.

Residence time evaluations were performed, where, after a steady state was achieved, a tracer was injected upstream of the reactor and the concentration of the tracer in a line downstream of the reactor was determined with time. In Example 2, the simulation was performed in accordance with the reactor of Example 1. In Example 3, the simulation was performed based on mixing in a Maxblend flat blade mixer from Sumitomo. The performance metrics of Examples 2 and 3 relative to the performance objectives are shown in Table 2. The concentration profiles were then compared to that of a theoretical continuously stirred tank (CSTR). The results are illustrated in FIG. 9.

In comparing Examples 4 and 5 and Examples 6 and 7, it is shown that at the same mixing speed, although the surface refresh rate is reduced, the mixing times are beneficially reduced when circular baffles are used as opposed to vertical baffles. Further, as compared to Example 8, there is a significant reduction in unit power.

TABLE 3

| Example | 4 | 5 | 6 | 7 | 8 |
|---|---|---|---|---|---|
| Baffles | Circular | Vertical | Circular | Vertical | Vertical with internal heating coils |
| Mixing Speed (rpm) | 100 | 100 | 60 | 60 | 53 |
| Normalized Surface Refresh Rate ($s^{-1}$) | 0.038 | 0.079 | 0.032 | 0.051 | 0.069 |
| Unit Power ($kW/m^3$) | 0.95 | 1.24 | 0.22 | 0.28 | 1.36 |
| Mixing Time (s) | 24 | 36 | 38 | 48 | 23 |

TABLE 2

| | Example | | Performance |
|---|---|---|---|
| | 2 | 3 | Objective |
| Reactor Volume (L) | 22,360 | 11,180 | 22,360 |
| Normalized Surface Refresh Rate at 0.2 m below the liquid level ($s^{-1}$) | 0.072 | 0.069 | ≥0.07 |
| Unit Power ($kW/m^3$) | 0.74 | 1.36 | ≤1.36 |
| Mixing Time (s) | 32 | 23 | ≤29 |
| Average residence time (min) | 47 | 46 | 46 |

Surprisingly, merely by utilizing an impeller mixer, the peak observed in Example 2 is nearly eliminated as compared to the flat blade mixer of Example 3 and the reactor of Example 2 achieves almost ideal mixing. FIG. 9 further clearly shows a delayed peak formation of Example 2 as compared to Example 3. This result indicates that using the impeller mixer, a longer residence time in the reactor is achieved for some fluid elements in the beginning part of residence time distribution (RTD) profile. In other words, the residence time distribution profile was improved and is closer to ideal residence time distribution behavior. Therefore, when the impeller mixer is used in an oligomerization reaction, a longer residence time can be achieved for some of the early leaving fluid elements, which can ultimately result in an increased reaction time for the reactants in the reactor and potentially allowing for the increased higher molecular weight with a reduced polydispersity.

It is further noted that the specific unit power of Example 2 was 40% less than the unit power of Example 3. Here, it is noted that not only is the mixing performance improved as shown by the improvement in the residence time distribution, but the mixing performance is improved using a reduced mixing power.

Examples 4-8

Effect of Baffles

The impeller reactors of Examples 4-7 were modelled in accordance with Example 1 except the type and number of baffles and the mixing speed was varied. The reactor of Example 8 was a Maxblend Sumitomo reactor of Example 3. The results are shown in Table 3. Surface refresh rate and mixing time are important metrics for mixing performance as they indicate the mixing effectiveness inside the reactor.

Set forth below are non-limiting embodiments of the present disclosure.

Aspect 1: A reactor for carrying out a melt transesterification reaction at a reactor temperature of 160 to 300° C. and a reactor pressure of 5 to 200 mbar, comprising: a cylindrical tank comprising a top, a side, and a bottom, wherein the bottom is convex, extending away from the top; a stirring shaft disposed within the cylindrical tank along an axis thereof so that it is rotatable from outside of the cylindrical tank; an impeller extending from the stirring shaft in the cylindrical tank and comprising a plurality of blades that are each independently at an angle α from an orthogonal of the axis; a reactant solution inlet; a reaction solution outlet; and an externally located heat exchanger in fluid communication with the cylindrical tank via a recirculation stream and a heated stream. The reactor can be a vertical reactor such that axis is perpendicular (within 10°, or 0 to 5°, or 0 to 1°) to at least one of a plane tangent to the bottom of the cylindrical tank or a top fluid plane as defined by a top surface of a resting liquid present in the cylindrical tank.

Aspect 2: The reactor of Aspect 1, wherein a lower impeller and an upper impeller extend from the stirring shaft, wherein the lower impeller and the upper impeller are both three blade impellers.

Aspect 3: The reactor of Aspect 2, wherein the lower impeller and the upper impeller are offset by an angle θ of 50 to 70 degrees.

Aspect 4: The reactor of any one or more of Aspects 2 to 3, wherein the angle α of the blades of the lower impeller and the angle α of the upper impeller are each independently 25 to 65 degrees.

Aspect 5: The reactor of any one or more of Aspects 2 to 4, wherein the lower impeller and the upper impeller direct a fluid flow in a direction of the stirring shaft towards the bottom of the cylindrical tank, from the bottom of the cylindrical tank towards the side of the cylindrical tank, and upward along the side of the cylindrical tank to form a circulation loop.

Aspect 6: The reactor of any one or more of the preceding aspects, wherein the externally located heat exchanger is in fluid communication with the cylindrical tank via the recirculation stream that connects a recirculation outlet with the externally located heat exchanger and the heated stream that connects a recirculation inlet with the externally located heat exchanger. In an aspect, the externally located heat exchanger is only in fluid communication with the cylindrical tank via the recirculation stream that connects a recirculation outlet with the externally located heat exchanger and the heated stream that connects a recirculation inlet with the externally located heat exchanger Aspect 7: The reactor of any one or more of the preceding aspects, wherein the impeller has a power number of less than or equal to 2.

Aspect 8: The reactor of any one or more of the preceding aspects, wherein the cylindrical tank is free of internally located heating coils.

Aspect 9: The reactor of any one or more of the preceding aspects, wherein a ratio of C:$D_I$ is 0.05 to 0.5; or 0.1 to 0.2 and a ratio of S:$D_I$ is 0.1 to 2; 0.1 to 1, wherein C is a length from a lowest point in the cylindrical tank to a lowest point on the impeller; $D_I$ is two times the length of a blade of the impeller; and S is a length from a level fluid line to a highest point of the impeller.

Aspect 10: A method of melt polymerizing a polycarbonate, comprising adding a precursor solution comprising a polycarbonate precursor to the reactor of any one or more of the preceding aspects through the reactant solution inlet; mixing and polymerizing the polycarbonate precursor at the reactor temperature of 160 to 300° C., preferably, 230 to 280° C., and the reactor pressure of 5 to 200 mbar to form a polycarbonate oligomer; and withdrawing a mixed solution comprising the polycarbonate oligomer having a weight average molecular weight that is greater than that of the polycarbonate precursor from the reaction solution outlet.

Aspect 11: The method of Aspect 10, wherein the mixed solution has a mixed solution viscosity of greater than or equal to 0.05 Pa·s.

Aspect 12: The method of any one or more of Aspects 10 to 11, wherein the polycarbonate precursor comprises bisphenol A and diphenyl carbonate.

Aspect 13: The method of any one or more of Aspects 10 to 12, further comprising directing the mixed solution into a second reactor optionally of any one or more of Aspects 1 to 9; mixing the mixed solution at a second temperature greater than the reactor temperature and a second pressure less than the reactor pressure; and withdrawing an oligomer solution from the second reactor comprising a high molecular weight polycarbonate oligomer having a weight average molecular weight that is greater than that of the polycarbonate oligomer.

Aspect 14: The method of any one or more of Aspects 10 to 13, wherein the mixing occurs at a rotation speed of the stirring shaft of 40 to 100 revolutions per minute.

Aspect 15: A method of polymerizing a polycarbonate, comprising: adding a carbonate precursor, a bisphenol, and a quaternary catalyst to a monomer mixing tank to form a precursor solution; adding the precursor solution to a first oligomeriser and mixing and polymerizing the polycarbonate precursor in the first oligomeriser at a first reactor temperature of 200 to 270° C., preferably, 245 to 265° C., and a first reactor pressure of 50 to 200 mbar to form a polycarbonate oligomer having a first viscosity of 0.05 to 0.5 Pa·s; withdrawing a mixed solution from the first oligomeriser comprising the polycarbonate oligomer having a weight average molecular weight that is greater than that of the polycarbonate precursor from the reaction solution outlet; directing the mixed solution into a second oligomeriser and mixing the mixed solution at a second temperature of 275 to 300° C. and a second pressure of 2 to 25 mbar; withdrawing an oligomer solution comprising a high molecular weight polycarbonate oligomer having a weight average molecular weight of 8 to 20 kilodaltons based on polystyrene standards and a viscosity of greater than or equal to 1 Pa·s; and directing the high molecular weight polycarbonate oligomer to a series of polymerization vessels; wherein at least of the first oligomeriser and the second oligomeriser are described by the reactor of any one or more of Aspects 1 to 9.

Aspect 16: The method of Aspect 15, wherein the first oligomeriser and the second oligomeriser are described by the reactor of any one or more of Aspects 1 to 9, wherein the first oligomeriser has two impellers located on the stirring shaft and the second oligomeriser has one impeller located on the stirring shaft.

Aspect 17: Use of the reactor of any one or more of Aspects 1 to 9 in preparing a polycarbonate oligomer.

Aspect 18: The method of any one or more of the preceding method aspects, wherein the impeller has a power number of less than or equal to 2.

Aspect 19: The method of any one or more of the preceding method aspects, further comprising directing a recirculation stream from the cylindrical tank to the externally located heat exchanger; heating the recirculation stream in the externally located heat exchanger to form the heated stream; and directing the heated stream back into the cylindrical tank.

Aspect 20: The method of Aspect 19, wherein an increased temperature of the heated stream, $T_f$, is greater than an initial temperature of the recirculation stream, $T_i$, for example, $T_f$ is greater than or equal to $T_i+10°$ C., or greater than or equal to $T_i+20°$ C., or greater than or equal to $T_i+50°$ C., optionally, less than or equal to $T_i+100°$ C.

Aspect 21: The method of any one or more of Aspects 19 to 20, wherein all of the recirculation stream withdrawn from the cylindrical tank, for example, 99 to 100 wt % based on the total weight of the recirculation stream withdrawn, is reintroduced to the cylindrical tank as the heated stream.

Aspect 22: The method of any one or more of Aspects 19 to 21, wherein one or both of the recirculation stream and the heated stream are in the liquid form.

Aspect 23: The method of any one or more of Aspects 19 to 22, wherein a mass flow rate of the recirculation stream entering the external heat exchanger is equal to a mass flow rate of the heated stream exiting the external heat exchanger. For example, a mass flow rate of the heated stream can be within 5%, or within 1%, or within 0.1% of the mass flow rate of the recirculation stream.

Aspect 24: The method of any one or more of Aspects 19 to 23, wherein the heated stream entering the cylindrical tank comprises, or consists essentially of only the heated composition of the recirculation stream. In an aspect, the heated stream can be free of an additionally added component.

Aspect 25: The reactor of any one or more of the preceding aspects further comprising a controller configured to control at least one of a flow rate, a pressure, or a temperature in the reactor and a method one or more of the preceding aspects can comprise monitoring at least one of a flow rate, a pressure, or a temperature in the reactor and adjusting one or more of said variables via a controller.

Aspect 25: The reactor of any one or more of the preceding aspects, wherein the heated stream is only in fluid communication with the externally located heat exchanger and the cylindrical tank.

Aspect 26: The reactor of any one or more of the preceding aspects, wherein the recirculation stream are only in fluid communication with the cylindrical tank and the externally located heat exchanger.

Aspect 27: The reactor of any one or more of the preceding aspects, wherein the externally located heat exchanger is configured to impart a heat to the recirculation stream.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an embodiment", "another embodiment", "some embodiments", "an aspect", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. "Optional" or "optionally" means that the subsequently described event or circumstance may or may not occur, and that the description includes instances where the event occurs and instances where it does not. The term "combination" is inclusive of blends, mixtures, alloys, reaction products, and the like. The suffix "(s)" as used herein is intended to include both the singular and the plural of the term that it modifies, thereby including one or more of that term (e.g., the colorant(s) includes one or more colorants). Unless specifically stated, the terms "first," "second," and the like, "primary," "secondary," and the like, as used herein do not denote any order, quantity, or importance, but rather are used to distinguish one element from another. Also, "at least one of" means that the list is inclusive of each element individually, as well as combinations of two or more elements of the list, and combinations of at least one element of the list with like elements not named.

In general, the compositions, methods, and articles can alternatively comprise, consist of, or consist essentially of, any ingredients, steps, or components herein disclosed. The compositions, methods, and articles can additionally, or alternatively, be formulated, conducted, or manufactured so as to be devoid, or substantially free, of any ingredients, steps, or components not necessary to the achievement of the function or objectives of the present claims.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," for example, 10 to 23 wt %, etc.

Unless defined otherwise, technical and scientific terms used herein have the same meaning as is commonly understood by one of skill in the art to which this invention belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A reactor for carrying out a melt transesterification reaction at a reactor temperature of 160 to 300° C. and a reactor pressure of 5 to 200 mbar, comprising:
    a cylindrical tank comprising a top, a side, and a bottom, wherein the bottom is convex, extending away from the top;
    a stirring shaft disposed within the cylindrical tank along an axis thereof so that it is rotatable from outside of the cylindrical tank;
    an impeller extending from the stirring shaft in the cylindrical tank and comprising a plurality of blades that are each independently at an angle $\alpha$ from an orthogonal of the axis;
    a reactant solution inlet;
    a reaction solution outlet; and
    an externally located heat exchanger in fluid communication with the cylindrical tank via a recirculation stream and a heated stream,
    wherein the reactor comprises at least one of
        i) a lower impeller and an upper impeller extending from the stirring shaft, wherein the lower impeller and the upper impeller are both three blade impellers and the lower impeller and the upper impeller are offset by an angle $\theta$ of 50 to 70 degrees,
        ii) a lower impeller and an upper impeller extending from the stirring shaft, wherein the lower impeller and the upper impeller are both three blade impellers and the angle $\alpha$ of the blades of the lower impeller and the angle $\alpha$ of the upper impeller are each independently 25 to 65 degrees, and
        iii) a ratio of C:DI of 0.05 to 0.5 and a ratio of S:DI of 0.1 to 2, wherein C is a length from a lowest point in the cylindrical tank to a lowest point on the impeller; DI is two times the length of a blade of the impeller; and S is a length from a level fluid line to a highest point of the impeller.

2. The reactor of claim 1, wherein the reactor comprises the lower impeller and the upper impeller extending from the stirring shaft, wherein the lower impeller and the upper impeller are both three blade impellers and the lower impeller and the upper impeller are offset by the angle $\theta$ of 50 to 70 degrees.

3. The reactor of claim 1, wherein the reactor comprises the lower impeller and the upper impeller extending from the stirring shaft, wherein the lower impeller and the upper impeller are both three blade impellers and the angle $\alpha$ of the blades of the lower impeller and the angle $\alpha$ of the upper impeller are each independently 25 to 65 degrees.

4. The reactor of claim 1, wherein the reactor comprises the lower impeller and the upper impeller extending from the stirring shaft, wherein the lower impeller and the upper impeller are both three blade impellers and the lower impeller and the upper impeller direct a fluid flow in a direction of the stirring shaft towards the bottom of the cylindrical tank, from the bottom of the cylindrical tank towards the side of the cylindrical tank, and upward along the side of the cylindrical tank to form a circulation loop.

5. The reactor of claim 1, wherein the externally located heat exchanger is in fluid communication with the cylindrical tank via the recirculation stream that connects a recirculation outlet with the externally located heat exchanger and the heated stream that connects a recirculation inlet with the externally located heat exchanger.

6. The reactor of claim 1, wherein the cylindrical tank is free of internally located heating coils.

7. The reactor of claim 1, wherein the reactor comprises the ratio of C:DI of 0.05 to 0.5 and the ratio of S:DI of 0.1 to 2, wherein C is the length from the lowest point in the cylindrical tank to the lowest point on the impeller; DI is two times the length of the blade of the impeller; and S is the length from the level fluid line to the highest point of the impeller.

8. The reactor of claim 1, wherein the reaction solution outlet is located on the bottom of the cylindrical tank.

9. The reactor of claim 1, wherein the recirculation outlet is located on the bottom of the cylindrical tank.

10. The reactor of claim 1, wherein the recirculation inlet is located on the side of the cylindrical tank.

11. The reactor of claim 1, wherein the recirculation inlet is located on the bottom of the cylindrical tank.

12. A reactor for carrying out a melt transesterification reaction at a reactor temperature of 160 to 300° C. and a reactor pressure of 5 to 200, comprising:
- a cylindrical tank comprising a top, a side, and a bottom, wherein the bottom is convex, extending away from the top;
- a stirring shaft disposed within the cylindrical tank along an axis thereof so that it is rotatable from outside of the cylindrical tank;
- an impeller extending from the stirring shaft in the cylindrical tank and comprising a plurality of blades that are each independently at an angle α from an orthogonal of the axis;
- a reactant solution inlet;
- a reaction solution outlet; and
- an externally located heat exchanger in fluid communication with the cylindrical tank via a recirculation stream and a heated stream, wherein at least one of
- (i) the externally located heat exchanger is in fluid communication with an interior of the cylindrical tank via the recirculation stream and the heated stream, and
- (ii) the angle α of each of the plurality of blades independently is 25 to 65 degrees and the reactor is a vertical reactor.

13. The reactor of claim 12, wherein the angle α of each of the plurality of blades independently is 25 to 65 degrees and the reactor is vertical.

14. The reactor of claim 12, wherein the externally located heat exchanger is in fluid communication with the interior of the cylindrical tank via the recirculation stream and the heated stream.

15. A method of melt polymerizing a polycarbonate, comprising:
adding a precursor solution comprising a polycarbonate precursor to a reactor for carrying out a melt transesterification reaction at a reactor temperature of 160 to 300° C. and a reactor pressure of 5 to 200 mbar, the reactor comprising:
- a cylindrical tank comprising a top, a side, and a bottom, wherein the bottom is convex, extending away from the top;
- a stirring shaft disposed within the cylindrical tank along an axis thereof so that it is rotatable from outside of the cylindrical tank;
- an impeller extending from the stirring shaft in the cylindrical tank and comprising a plurality of blades that are each independently at an angle α from an orthogonal of the axis;
- a reactant solution inlet;
- a reaction solution outlet; and
- an externally located heat exchanger in fluid communication with the cylindrical tank via a recirculation stream and a heated stream, wherein adding the precursor solution comprising the polycarbonate precursor to the reactor comprises adding the precursor solution comprising the polycarbonate precursor to the reactor through the reactant solution inlet;
mixing and polymerizing the polycarbonate precursor at the reactor temperature of 160 to 300° C., and the reactor pressure of 5 to 200 mbar to form a polycarbonate oligomer; and
withdrawing a mixed solution comprising the polycarbonate oligomer having a weight average molecular weight that is greater than that of the polycarbonate precursor from the reaction solution outlet.

16. The method of claim 15, wherein the mixed solution has a mixed solution viscosity of greater than or equal to 0.05 Pa's.

17. The method of claim 15, wherein the polycarbonate precursor comprises bisphenol A and diphenyl carbonate.

18. The method of claim 15, further comprising
directing the mixed solution into a second reactor;
mixing the mixed solution at a second temperature greater than the reactor temperature and a second pressure less than the reactor pressure; and
withdrawing an oligomer solution from the second reactor comprising a high molecular weight polycarbonate oligomer having a weight average molecular weight that is greater than that of the polycarbonate oligomer.

19. The method of claim 15, wherein the mixing occurs at a rotation speed of the stirring shaft of 40 to 100 revolutions per minute.

20. The method of claim 15, wherein the impeller has a power number of less than or equal to 2.

* * * * *